(12) United States Patent
Maruyama et al.

(10) Patent No.: US 11,018,420 B2
(45) Date of Patent: May 25, 2021

(54) DISPLAY DEVICE AND COMMUNICATION SYSTEM

(71) Applicant: SHARP KABUSHIKI KAISHA, Sakai (JP)

(72) Inventors: Takenori Maruyama, Sakai (JP); Kazutoshi Kida, Sakai (JP); Shinji Yamagishi, Sakai (JP); Jean Mugiraneza, Sakai (JP); Takuma Yamamoto, Sakai (JP); Yukio Mizuno, Sakai (JP); Yasuhiro Sugita, Sakai (JP); Hiroshi Fukushima, Sakai (JP); Hidetsugu Kawamori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/584,543

(22) Filed: Sep. 26, 2019

(65) Prior Publication Data

US 2020/0119438 A1    Apr. 16, 2020

Related U.S. Application Data

(60) Provisional application No. 62/743,668, filed on Oct. 10, 2018.

(51) Int. Cl.
*H01Q 1/44* (2006.01)
*H01Q 1/36* (2006.01)
(Continued)

(52) U.S. Cl.
CPC ........... *H01Q 1/44* (2013.01); *G02F 1/13338* (2013.01); *G06F 3/0446* (2019.05); *H01Q 1/22* (2013.01);
(Continued)

(58) Field of Classification Search
CPC ..... G02F 1/13338; G02F 2001/133331; G06F 1/1601; G06F 3/0443; G06F 3/0446;
(Continued)

(56) References Cited

U.S. PATENT DOCUMENTS 9,178,572 B1* 11/2015 Zhang ................ H04B 5/0012
2014/0104157 A1* 4/2014 Burns ..................... H01Q 1/44
345/156

(Continued)

FOREIGN PATENT DOCUMENTS

JP     2016-143971 A     8/2016

*Primary Examiner* — Kwin Xie
(74) *Attorney, Agent, or Firm* — ScienBiziP, P.C.

(57) ABSTRACT

A display device includes a display panel displaying an image, a transparent antenna substrate arranged on one surface of the display panel and having transparency, a first conductive film having a mesh shape and arranged on a surface of the transparent antenna substrate opposite to the display panel, and a second conductive film having a mesh shape and arranged on a surface of the transparent antenna substrate facing the display panel. The first conductive film includes an antenna body portion having a thin film pattern and insulated from a surrounding portion by a slit, and the antenna body portion constitutes a transparent antenna performing wireless communication with an external communication device.

13 Claims, 13 Drawing Sheets

(51) Int. Cl.
*H01Q 1/22* (2006.01)
*G06F 3/044* (2006.01)
*G02F 1/1333* (2006.01)

(52) U.S. Cl.
CPC ..... *H01Q 1/36* (2013.01); *G06F 2203/04107* (2013.01); *G06F 2203/04112* (2013.01)

(58) Field of Classification Search
CPC ........ H01L 27/3225; H01Q 1/22; H01Q 1/36; H01Q 1/44; H04B 5/0075
USPC .................................................. 345/173–174
See application file for complete search history.

(56) References Cited

U.S. PATENT DOCUMENTS

| | | | |
|---|---|---|---|
| 2015/0311960 A1* | 10/2015 | Samardzija | H04B 5/02 455/90.3 |
| 2016/0226128 A1 | 8/2016 | Uraki et al. | |
| 2017/0153695 A1* | 6/2017 | Kawashima | G06F 1/1643 |
| 2017/0207516 A1* | 7/2017 | Koo | H01Q 9/42 |
| 2017/0365908 A1* | 12/2017 | Hughes | H01Q 1/38 |
| 2018/0182556 A1* | 6/2018 | Linn | H01Q 1/48 |
| 2019/0007120 A1* | 1/2019 | Hu | H01Q 1/243 |

* cited by examiner

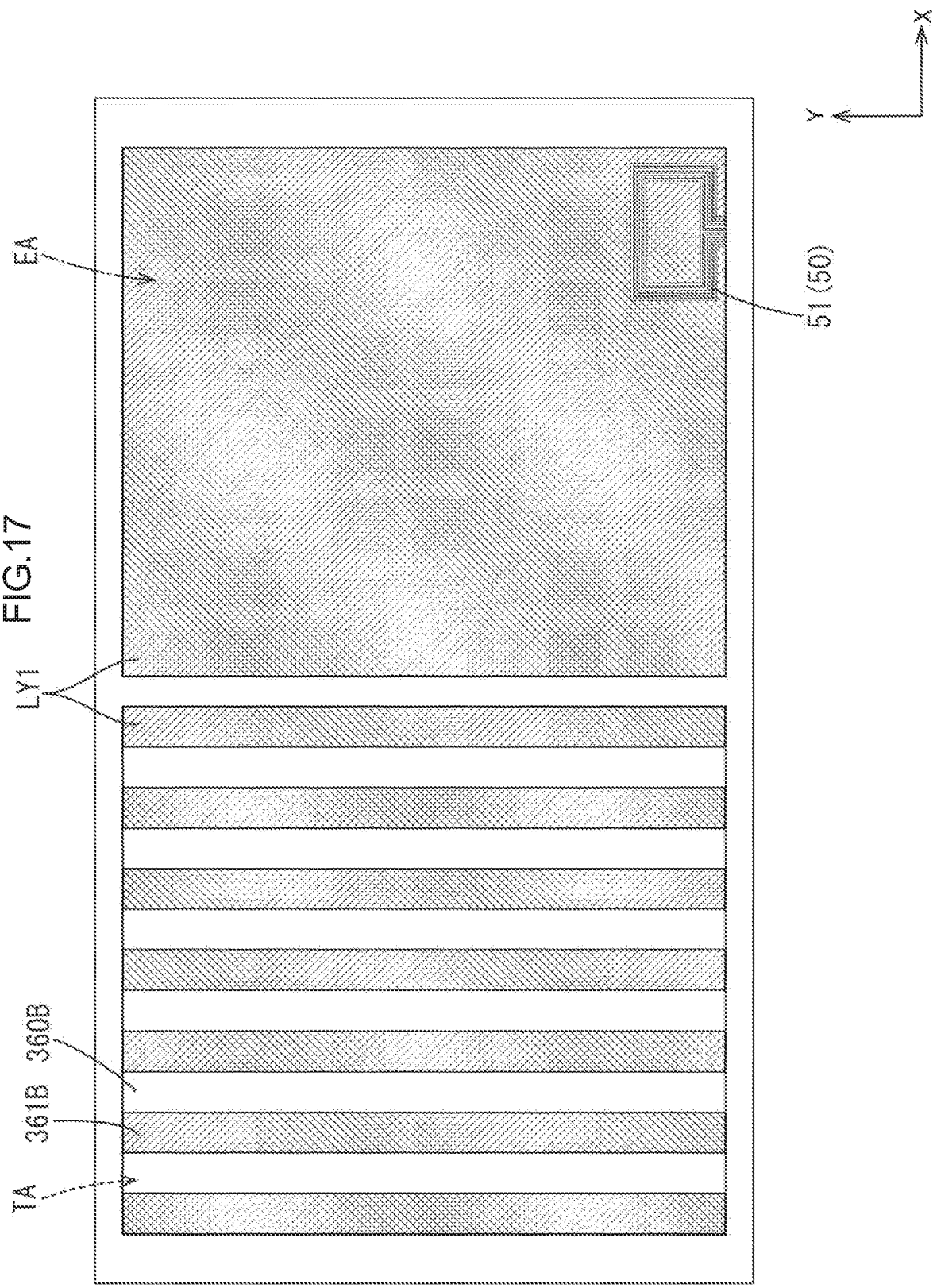

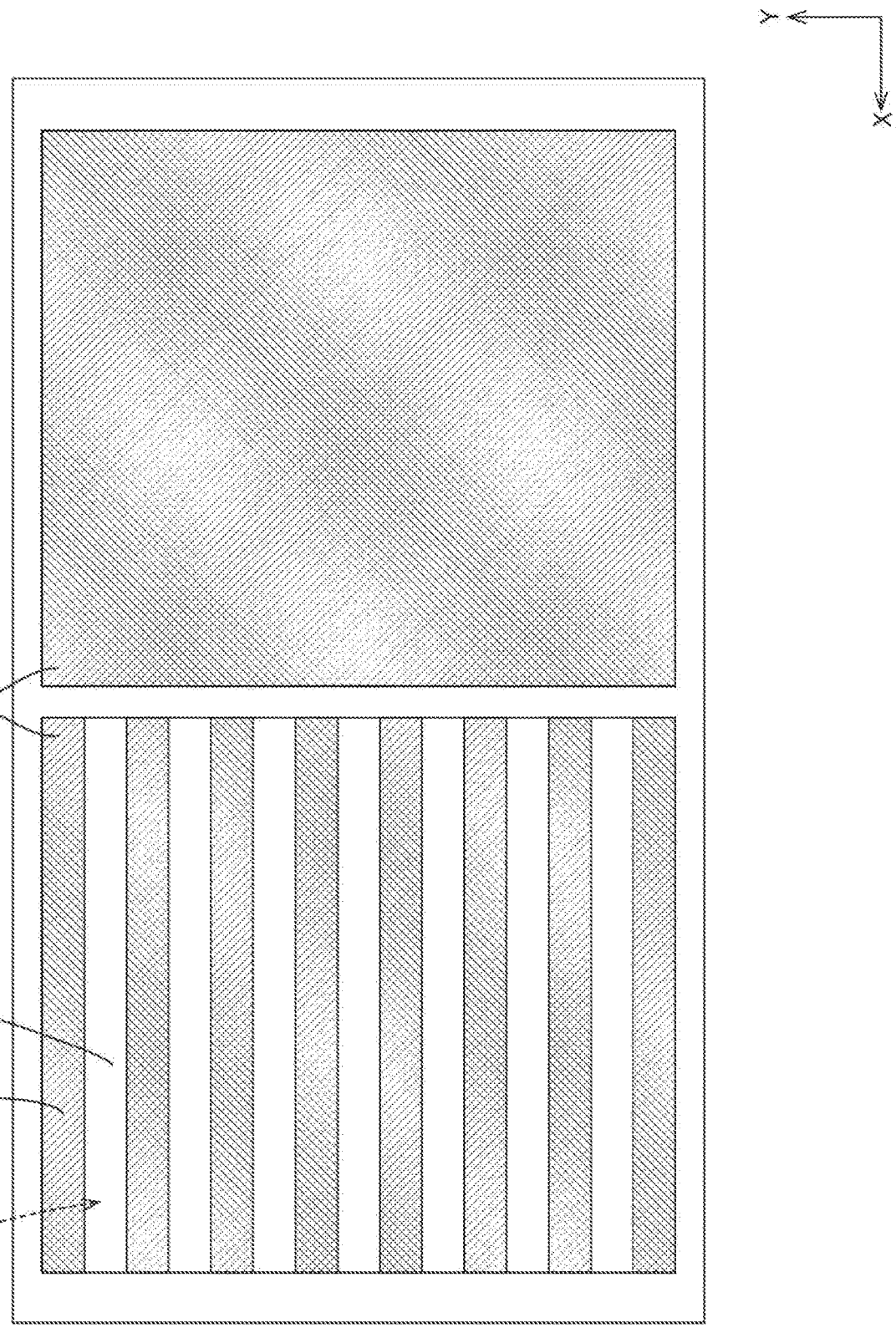

DISPLAY DEVICE AND COMMUNICATION SYSTEM

CROSS REFERENCE TO RELATED APPLICATION

This application claims priority from U.S. Provisional Patent Application No. 62/743,668 filed on Oct. 10, 2018. The entire contents of the priority application are incorporated herein by reference.

TECHNICAL FIELD

The technology described herein relates to a display device and a communication system.

BACKGROUND ART

Conventionally, a display device that performs short range wireless communication such as near field communication (NFC) or the like with an external communication device has been known, and one described in Japanese Unexamined Patent Application Publication No. 2016-143971 has been disclosed as an example of such a display device. The liquid crystal display device includes a liquid crystal panel, a backlight device that irradiates the liquid crystal panel with light, and an antenna arranged on a back side (a surface of a side opposite to the liquid crystal panel) of the backlight device. For example, electronic money settlement is possible by communication between the antenna of the liquid crystal display device and a device-side antenna of the external communication device.

In recent years, there is a demand for arranging the antenna of the liquid crystal display device on the liquid crystal panel rather than on the backlight device. For example, when a transparent antenna transmitting light therethrough is arranged on a front side (an outer side) of the liquid crystal panel, the antenna can be arranged without obstructing a display screen. Therefore, a user can put an IC card (an example of the external communication device) over a display image of a product to perform electronic money settlement simultaneously with selection of the product.

However, when the antenna is arranged on the liquid crystal panel, transmission and reception may become unstable between the antenna and the device-side antenna of the external communication device, so that communication may not be possible. By arranging the antenna on the liquid crystal panel, the antenna approaches a drive circuit unit of the liquid crystal panel. For this reason, the antenna receives a noise generated from the drive circuit unit, and the noise causes deterioration in transmission/reception characteristics of the antenna.

SUMMARY

The technology described herein has been completed on the basis of the above situation, and an object of the present technology is to reduce a reception noise of an antenna arranged on a liquid crystal panel to improve transmission/reception characteristics of the antenna.

A display device according to the present technology includes a display panel displaying an image, a transparent antenna substrate arranged on one surface of the display panel and having transparency, a first conductive film having a mesh shape and arranged on a surface of the transparent antenna substrate opposite to the display panel, and a second conductive film having a mesh shape and arranged on a surface of the transparent antenna substrate facing the display panel. The first conductive film includes an antenna body portion having a thin film pattern and insulated from a surrounding portion by a slit. The antenna body portion constitutes a transparent antenna performing wireless communication with an external communication device.

According to the present technology described herein, it is possible to reduce a reception noise of an antenna arranged on a liquid crystal panel to improve transmission/reception characteristics of the antenna.

BRIEF DESCRIPTION OF THE DRAWINGS

FIG. 17 is an overall plan view of a first conductive film of a liquid crystal display device according to a sixth embodiment.

FIG. 18 is an overall plan view of a second conductive film of the liquid crystal display device according to the sixth embodiment.

DETAILED DESCRIPTION

First Embodiment

A first embodiment will be described with reference to FIGS. 1 to 6. In the present embodiment, a communication system 30 including an IC card 10 (an example of an external communication device) and a liquid crystal display device 20 (an example of a display device) that can perform short-range wireless communication with the IC card 10 is illustrated. Note that an X axis, a Y axis, and a Z axis are shown in some of the drawings, and each axis direction is drawn to be a common direction in each drawing. In addition, a +Z-axis direction is a front side of the liquid crystal display device 20, and a −Z-axis direction is a back side of the liquid crystal display device 20.

Figure 1:
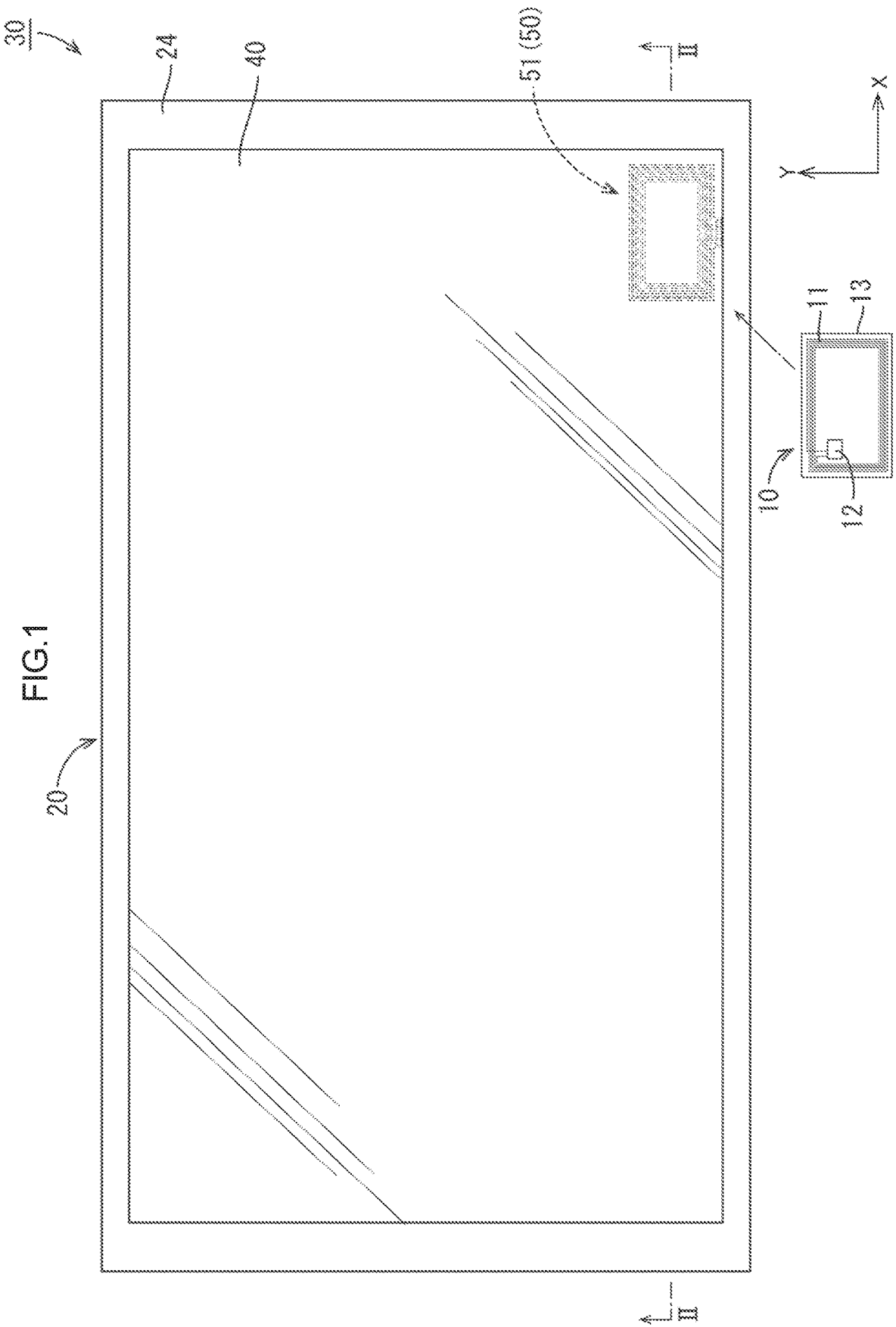
FIG. 1 is a plan view of a communication system according to a first embodiment.

The IC card 10 includes a coil-like card-side antenna 11 in which a winding formed of, for example, copper is wound, an IC 12 connected to the card-side antenna 11, and a plate-like card base 13 on which the card-side antenna 11 and the IC 12 are mounted, as shown in FIG. 1. The card-side antenna 11 is formed on the card base 13 by printing so as to be wound several times in a rectangular shape along an outer periphery of the card base 13. In addition, the IC card 10 includes a memory, a resonance circuit, and a modulation circuit.

The liquid crystal display device 20 has a horizontally long rectangular shape as a whole, as shown in FIG. 1, and is used for various electronic devices such as an information display, a touch panel-type information terminal and the like. A liquid crystal panel 40 displaying an image is arranged on a front surface (a front side) of the liquid crystal display device 20, and a transparent antenna 50 as described later is provided on a back side of one corner of the liquid crystal panel 40. When the IC card 10 is brought close to this area as shown by an arrow in FIG. 1, the card-side antenna 11 of the IC card 10 and the transparent antenna 50 of the liquid crystal display device 20 perform short-range wireless communication with each other to transmit and receive data. The communication system 30 is configured such that the IC card 10 and the liquid crystal display device 20 communicate with each other in this manner.

Figure 2:
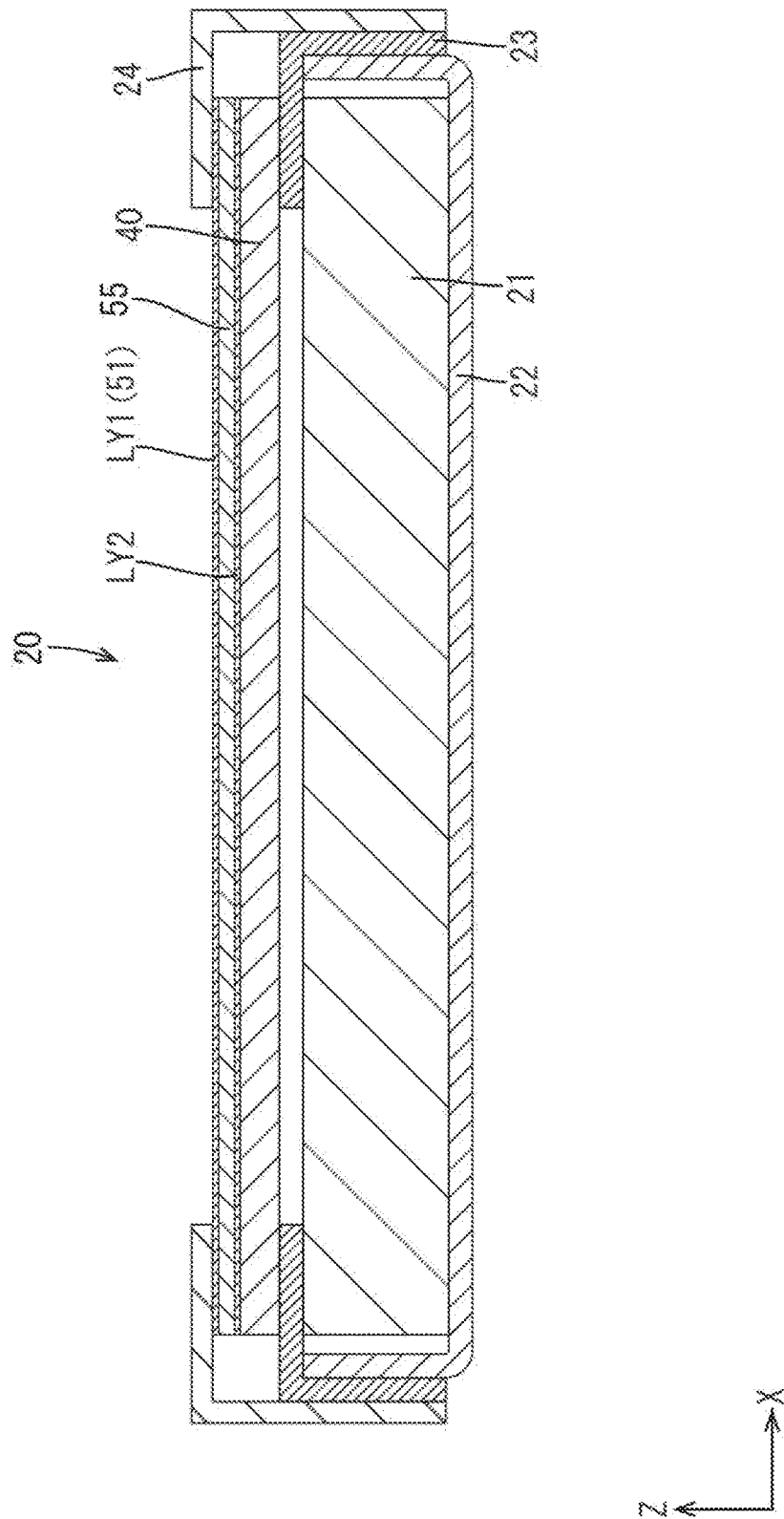
FIG. 2 is a cross-sectional view taken along line II-II of a liquid crystal display device of FIG. 1.

The liquid crystal display device 20 includes the liquid crystal panel 40 that displays the image, a transparent antenna substrate 55 that is arranged so as to face an outer side (a front side) of the liquid crystal panel 40 and has transparency, and a backlight device 21 (an example of a lighting device) that is an external light source irradiating the liquid crystal panel 40 with light, as shown in a cross-sectional view of FIG. 2. A first conductive film LY1 including an antenna body portion 51 of the transparent antenna 50 is arranged on a surface of a front side of the transparent antenna substrate 55, and a second conductive film LY2 is arranged on a surface of a back side of the transparent antenna substrate 55. Note that FIG. 2 schematically shows a laminated structure of the transparent antenna substrate 55 and the like for convenience of explanation, and a shape and the like of the antenna body portion 51 formed in the first conductive film LY1 are omitted. The backlight device 21 includes at least a light source (for example, a cold-cathode tube, a light emitting diode (LED), an organic electroluminescence (EL), or the like) and an optical member having an optical function such as a function of converting light emitted from the light source into a planar shape. The liquid crystal display device 20 includes a chassis 22 accommodating the backlight device 21, a frame 23 holding the backlight device 13 between the chassis 22 and the frame 23, and a bezel 24 holding the liquid crystal panel 40 and the transparent antenna substrate 55 between the frame 23 and the bezel 24.

Next, the liquid crystal panel 40 will be described in detail. In the liquid crystal panel 40, as shown in a plan view of FIG. 3, a central portion of a screen is a display area (an area surrounded by an alternate long and short dash line in FIG. 3) AA on which an image is displayed. On the other hand, a frame-like outer peripheral edge portion surrounding the display area AA on the screen of the liquid crystal panel 40 is a non-display area NAA in which the image is not displayed. The liquid crystal panel 40 has a configuration in which a pair of substrates 41 and 42 is stuck to each other in a state where they are spaced apart from each other by a predetermined gap in a Z-axis direction and a liquid crystal containing liquid crystal molecules whose optical characteristics change with application of an electric field is sealed between both the substrates.

Figure 3:
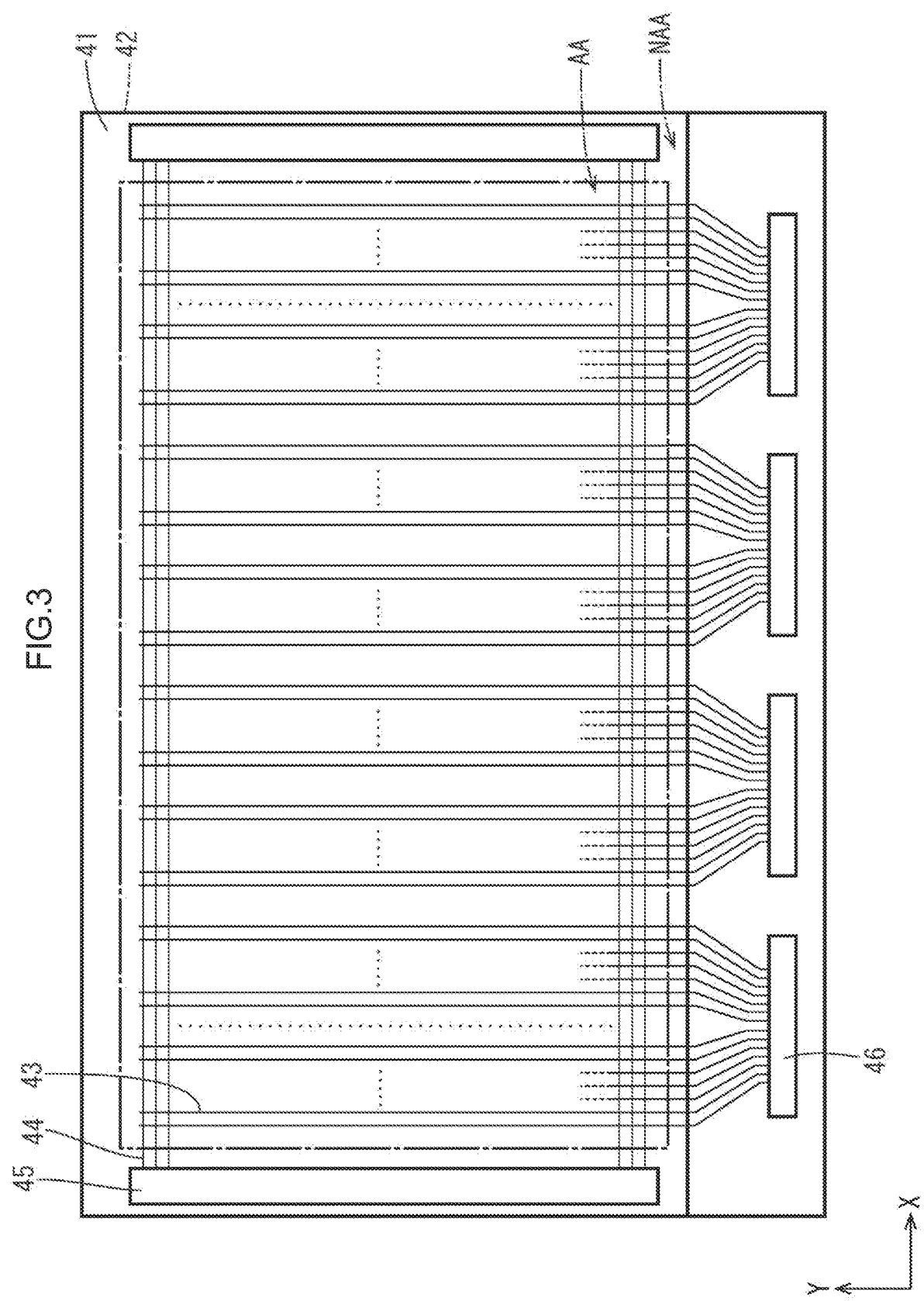
FIG. 3 is a plan view showing a line structure of a liquid crystal panel.

As shown in FIG. 3, multiple source lines 43 and gate lines 44 orthogonal to each other are formed in a lattice shape on one substrate (an array substrate 41). Switching elements (for example, thin film transistors (TFTs)), pixel electrodes connected to the switching elements, and the like are provided in the vicinity of intersections between the source lines 43 and the gate lines 44. The gate lines 44 are connected to gate drive circuits 45 formed on the array substrate 41 at both short side portions (end portions along the Y axis) of the non-display area NAA. In addition, the source lines 43 are connected to source drive circuits in driver LSIs 46 mounted on one long side portion (an end portion along the X axis) of the non-display area NAA. The gate drive circuits 45 and the source drive circuits in the driver LSIs 46 are circuits for supplying signals for driving the liquid crystal panel 40 to the gate lines 44 and the source lines 43, respectively. The signals transmitted from these drive circuits are input to the respective switching elements through the source lines 43 and the gate lines 44 to change potentials of the pixel electrodes connected to the switching elements. The liquid crystal panel 40 is driven by controlling the electric field applied to the liquid crystal by the potentials of the pixel electrodes to appropriately switch an alignment state of the liquid crystal molecules.

Color filters and the like in which colored portions such as red (R), green (G), blue (B) and the like are arranged in a predetermined array are provided on the other substrate (a CF substrate 42). In the display area AA of the liquid crystal panel 40, multiple pixels are arranged side by side in a matrix shape along an X-axis direction and a Y-axis direction in a plane of a display surface. This pixel is configured by the pixel electrode of the array substrate 41 and the colored portion of the CF substrate 42 to enable color display. Note that a pair of front and back polarizing plates is attached to outer surface sides of the pair of substrates 41 and 42, respectively.

Next, the transparent antenna substrate 55 and the first conductive film LY1 and the second conductive film LY2 arranged on the transparent antenna substrate 55 will be described. The transparent antenna substrate 55 is formed of a synthetic resin material, has excellent translucency, and is substantially transparent. The transparent antenna substrate 55 has a sheet shape, and a size and an appearance of the transparent antenna substrate 55 when viewed in a plane are substantially the same as those of the liquid crystal panel 40.

As shown in FIG. 2, the first conductive film LY1 is arranged on a surface of the front side (a side opposite to the liquid crystal panel 40) of the transparent antenna substrate 55, and the second conductive film LY2 is arranged on the surface of the back side (a side close to the liquid crystal panel 40) of the transparent antenna substrate 55. Note that a cover glass for protecting the first conductive film LY1 and insulating the first conductive film LY1 from the outside is attached to a front side (an outer side) of the first conductive film LY1.

Figure 4:
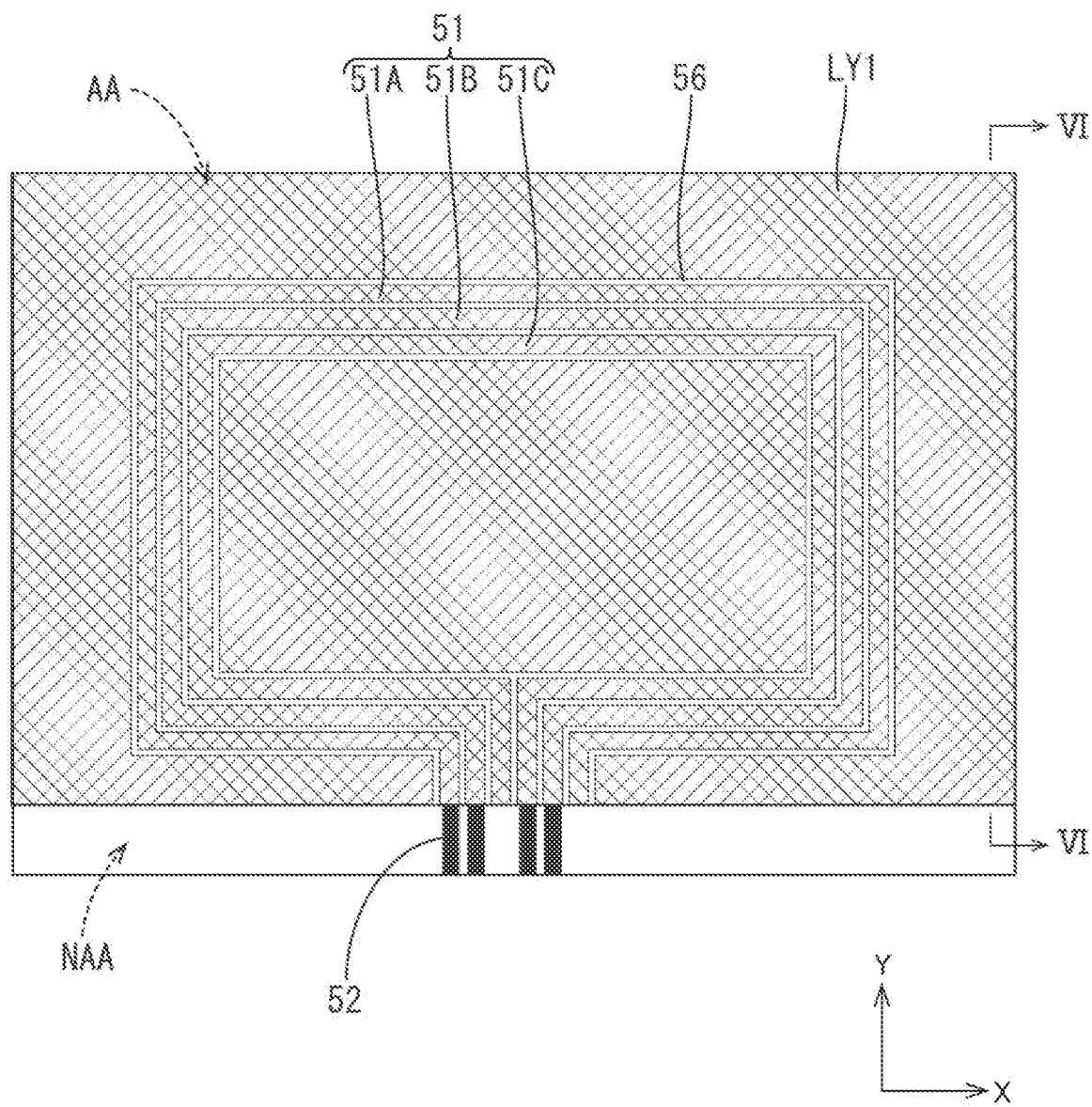
FIG. 4 is a partial plan view showing the vicinity of an antenna body portion of a first conductive film.
Figure 5:
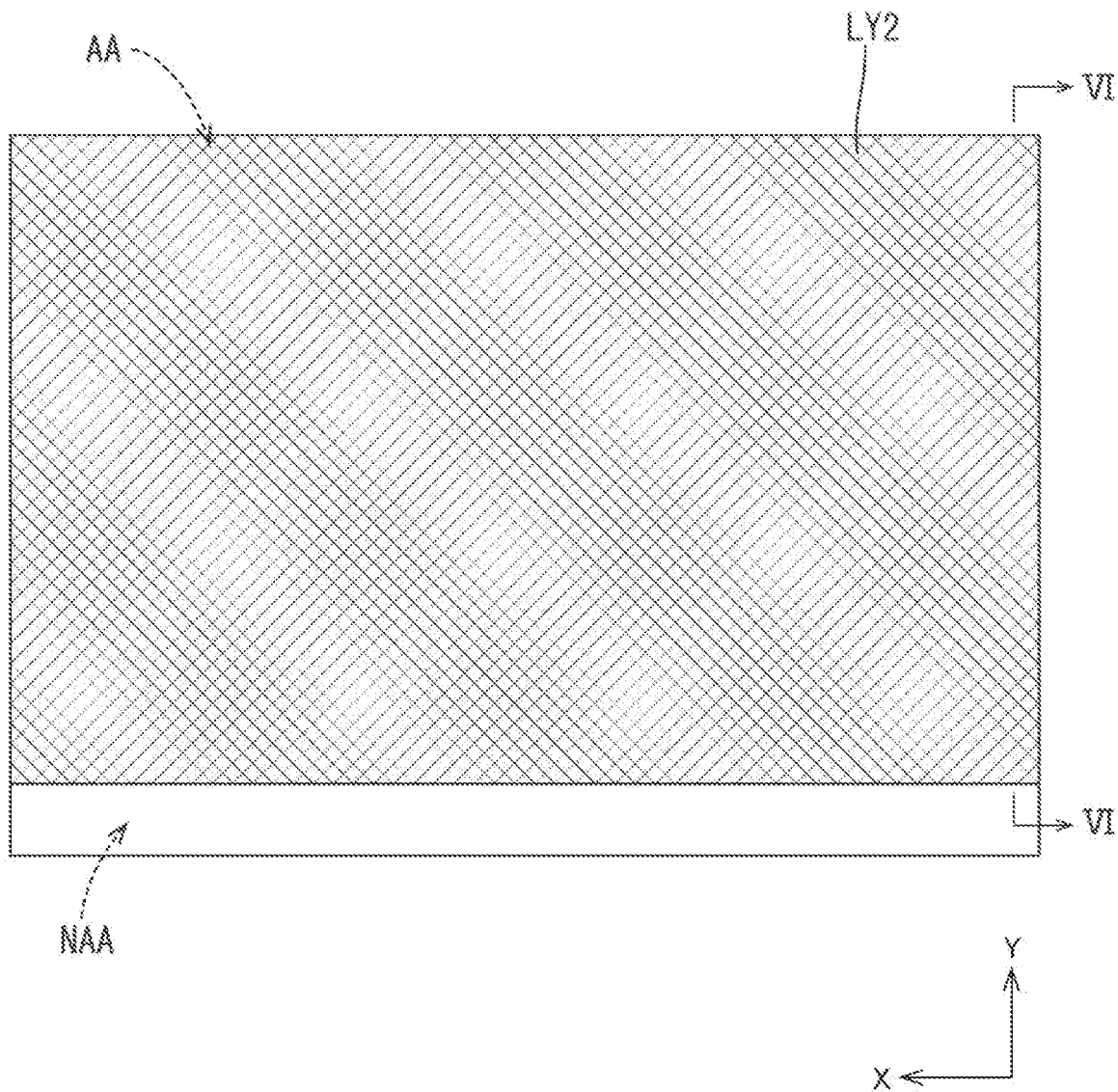
FIG. 5 is a partial plan view showing a second conductive film facing FIG. 4.
Figure 6:
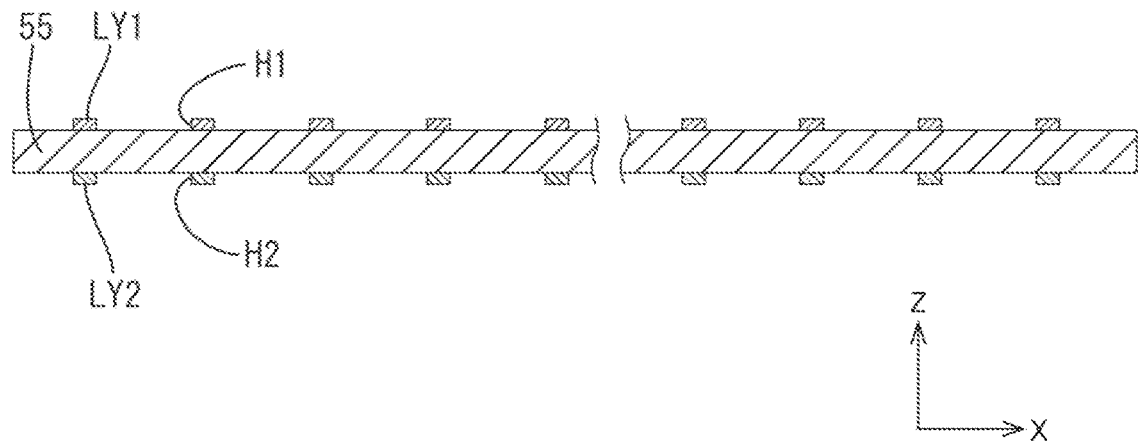
FIG. 6 is an enlarged cross-sectional view of a transparent antenna substrate and a first conductive film and a second conductive film arranged on the transparent antenna substrate.

The first conductive film LY1 and the second conductive film LY2 are shown in enlarged plan views of FIGS. 4 and 5, respectively. Both of the first conductive film LY1 and the second conductive film LY2 have a mesh shape, and are formed by, for example, by forming a solid metal film (such as a copper foil) having a light blocking property on the transparent antenna substrate 55 and then performing etching or the like on the solid metal film to pattern multiple fine stitches (openings). Shapes and sizes of the respective stitches are the same as each other, so that the respective stitches are equally arranged, and a diagonal pitch (a length of a diagonal line of the stitch having a square shape) of the stitch is, for example, about 0.5 mm. By forming the first conductive film LY1 and the second conductive film LY2 in such a mesh shape, it is possible to ensure light transmittance of the first conductive film LY1 and the second conductive film LY2 to a certain extent by the light passing through a mesh.

It is preferable that patterns of stitches H1 of the first conductive film LY1 and patterns of stitches H2 of the second conductive film LY2 coincide with each other as shown in FIGS. 4 and 5. In that case, as shown in an enlarged cross-sectional view of FIG. 6, the stitches H1 of the first conductive film LY1 and the stitches H2 of the second conductive film LY2 overlap each other vertically (along the Z-axis direction). In such a manner, the light emitted from the liquid crystal panel 40 and passing through the stitches H2 of the second conductive film LY2 passes through the transparent antenna substrate 55 and passes through the stitches H1 of the first conductive film LY1 arranged in front of the transparent antenna substrate 55. The second conductive film LY2 achieves a shield effect as described later, but it is possible to prevent the light transmittance from the liquid crystal panel 40 from being significantly reduced by the arrangement of the second conductive film LY2.

The first conductive film LY1 is formed over substantially the entire area of a plate surface of the front side of the transparent antenna substrate 55 that overlaps the display area AA of the liquid crystal panel 40, as shown in FIG. 2. In addition, a slit 56 for defining the transparent antenna 50 is formed in the first conductive film LY1, as shown in FIG. 4. The transparent antenna 50 includes the antenna body portion 51 having a thin film pattern and insulated from the surrounding by the slit 56, and further includes an antenna connection line portion 52 led from an end portion of the antenna body portion 51 and provided in an area overlapping the non-display area NAA of the liquid crystal panel 40. The antenna connection line portion 52 need not have a mesh shape, and is formed as a normal lead line.

The antenna body portion 51 is a coil including three conductor portions 51A, 51B, and 51C having an annular shape, as shown in FIG. 4, and when a current is supplied to the conductor portions 51A, 51B, and 51C, a magnetic field is generated at the center side of the antenna body portion 51. In addition, when the external communication device (the IC card 10) approaches the antenna body portion 51 and the antenna body portion 51 detects a magnetic field from the card-side antenna 11, an electromotive force is generated in the conductor portions 51A, 51B, and 51C by electromagnetic induction. As described above, when the external communication device approaches the antenna body portion 51 such that the card-side antennas 11 overlap the antenna body portion 51, the antenna body portion 51 transmits and receives data in a non-contact manner through coupling by electromagnetic induction between the coils. In addition, since the antenna body portion 51 is formed by the slit 56 in a part of the first conductive film LY1, the antenna body portion 51 is hardly visually conspicuous and a display defect that the antenna body portion 51 is visually recognized from the outside hardly occur, as compared with a case of forming only the thin film pattern of the antenna body portion on the transparent antenna substrate 55.

The second conductive film LY2 according to the present embodiment is formed on the surface of the back side of the transparent antenna substrate 55 so as to face the first conductive film LY1 at least in a range in which it overlaps the antenna body portion 51. In the present embodiment, as shown in FIG. 2, the second conductive film LY2 is formed so as to overlap the entire area of the first conductive film LY1. By forming the second conductive film LY2 as described above, it is possible to make a luminance of the liquid crystal display device 20 uniform in a plane as compared with a case where the second conductive film LY2 is formed only in a range in which it overlaps the antenna body portion 51. In other words, the second conductive film LY2 is formed to be interposed between the liquid crystal panel 40 and the antenna body portion 51 so as to face the antenna body portion 51. When the second conductive film LY2 is arranged as described above, the second conductive film LY2 functions as a shield electrode for the antenna body portion 51. Here, in order to more effectively exert the shield effect of the second conductive film LY2, it is preferable that a potential of the second conductive film LY2 be set to a reference potential. Due to the shield effect of the second conductive film LY2, it is possible to suppress a noise generated from the liquid crystal panel 40 from reaching the antenna body portion 51, and it is thus possible to reduce the noise. Transmission/reception characteristics of the transparent antenna 50 are improved by the reduction of the noise. In other words, in the liquid crystal display device 20 according to the present embodiment, an antenna function is realized on one surface of a single transparent antenna substrate 55 arranged on the liquid crystal panel 40 and a shield function is realized on the other surface of the single transparent antenna substrate 55.

By the way, drive circuits for driving the liquid crystal panel 40 described above, specifically, the gate drive circuits 45 and the source drive circuits in the driver LSIs 46 are a noise generation source for such a transparent antenna 50. These drive circuits are provided at the peripheral edge portion, which is the non-display area NAA of the liquid crystal panel 40, as described above with reference to FIG. 3. Therefore, for example, as shown in FIG. 1, when the antenna body portion 51 is provided on a side close to the peripheral edge portion at which the drive circuits are arranged, in a plane of the first conductive film LY1, the antenna body portion 51 approaches the noise generation source. In the liquid crystal display device 20, even in such a case, it is possible to suppress the noise from reaching the antenna body portion 51 due to the shield effect of the second conductive film LY2 described above.

<First Modification and Second Modification>

Figure 7:
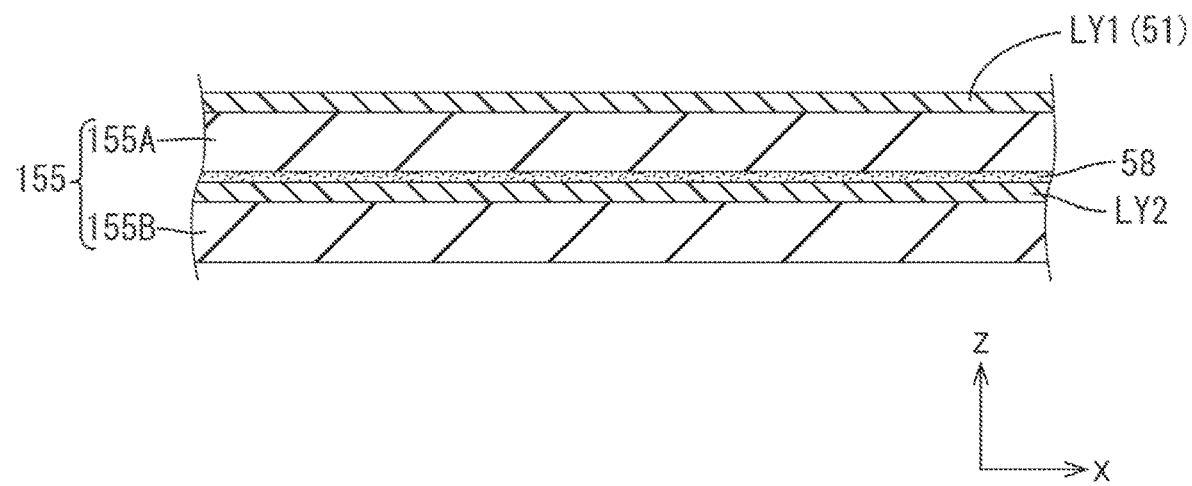
FIG. 7 is a cross-sectional view showing a laminated structure of a transparent antenna substrate and various members arranged on the transparent antenna substrate according to a first modification.
Figure 8:
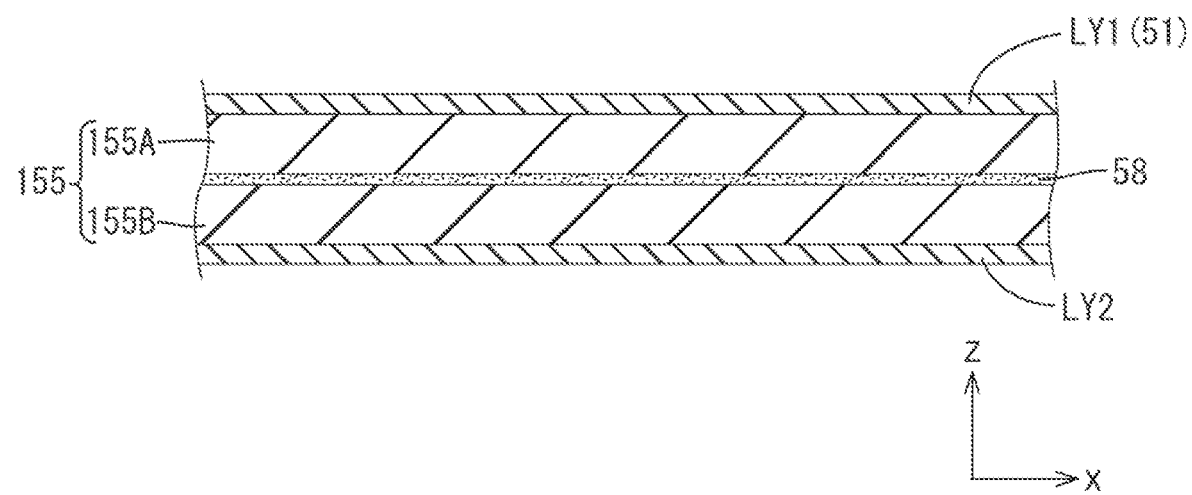
FIG. 8 is a cross-sectional view showing a laminated structure of a transparent antenna substrate and various members arranged on the transparent antenna substrate according to a second modification.

In liquid crystal display devices according to a first modification and a second modification, laminated structures of a transparent antenna substrate 155 and various members arranged on the transparent antenna substrate 155 are shown in FIGS. 7 and 8, respectively. The transparent antenna substrate 155 includes a first transparent antenna substrate 155A and a second transparent antenna substrate 155B arranged on a surface of a back side (a side close to a liquid crystal panel 40) of the first transparent antenna substrate 155A to be a plurality of configurations. In the first modification and the second modification, an overlapping description of the same configurations, actions, and effects as those of the first embodiment will be omitted.

In the first modification, a first conductive film LY1 including an antenna body portion 51 similar to that of the first embodiment is formed on one surface (a surface of a front side in the present modification) of the first transparent antenna substrate 155A, as shown in FIG. 7. In addition, a second conductive film LY2 similar to that of the first embodiment is formed on one surface (a surface of a front side in the present modification) of the second transparent antenna substrate 155B. The first transparent antenna substrate 155A on which the first conductive film LY1 is formed and the second transparent antenna substrate 155B on which the second conductive film LY2 are fixed and integrated with each other by arranging a substantially transparent adhesive layer 58 therebetween. The adhesive layer 58 is formed of a transparent optical adhesive film such as an optical clear adhesive (OCA) or the like. In such a manner, it is easy in terms of manufacture to provide the second conductive film LY2 so as to be interposed between the liquid crystal panel 40 and the antenna body portion 51.

In the second modification, a first conductive film LY1 including an antenna body portion 51 similar to that of the first embodiment is formed on one surface (a surface of a front side in the present modification) of the first transparent antenna substrate 155A, as shown in FIG. 8. In addition, a second conductive film LY2 similar to that of the first embodiment is formed on one surface (a surface of a back side unlike the first modification in the present modification) of the second transparent antenna substrate 155B. Similar to the first modification, the first transparent antenna substrate 155A on which the first conductive film LY1 is formed and the second transparent antenna substrate 155B on which the second conductive film LY2 is formed are integrated with each other by an adhesive layer 58. In such a manner, it is easy in terms of manufacture to provide the second conductive film LY2 so as to be interposed between the liquid crystal panel 40 and the antenna body portion 51, similar to the first modification.

As described above, each of the liquid crystal display devices 20 according to the first embodiment and the modifications (the first modification and the second modification) includes the liquid crystal panel 40 that displays the image and the transparent antenna substrate 55 (155) that is arranged on one surface of the liquid crystal panel 40 and has the transparency. The first conductive film LY1 having the mesh shape is arranged on the surface of the transparent antenna substrate 55 (155) opposite to the liquid crystal panel 40. The antenna body portion 51 having the thin film pattern and insulated from the surrounding by the slit 56 is formed in the first conductive film LY1. The antenna body portion 51 formed in the first conductive film LY1 constitutes the transparent antenna 50 performing the wireless communication with the IC card 10 is. The second conductive film LY2 having the mesh shape is arranged on the surface of the transparent antenna substrate 55 (155) close to the liquid crystal panel 40.

In such a manner, the second conductive film LY2 is interposed between the liquid crystal panel 40 and the transparent antenna 50 (the antenna body portion 51), so that the second conductive film LY2 functions as the shield electrode of the antenna body portion 51 with respect to the liquid crystal panel 40. Due to the shield effect of the second conductive film LY2, it is possible to suppress the noise generated from the liquid crystal panel 40 from reaching the antenna body portion 51. The transmission/reception characteristics of the transparent antenna 50 are improved by the reduction of the noise.

<Comparative Experiment>

Figure 9:
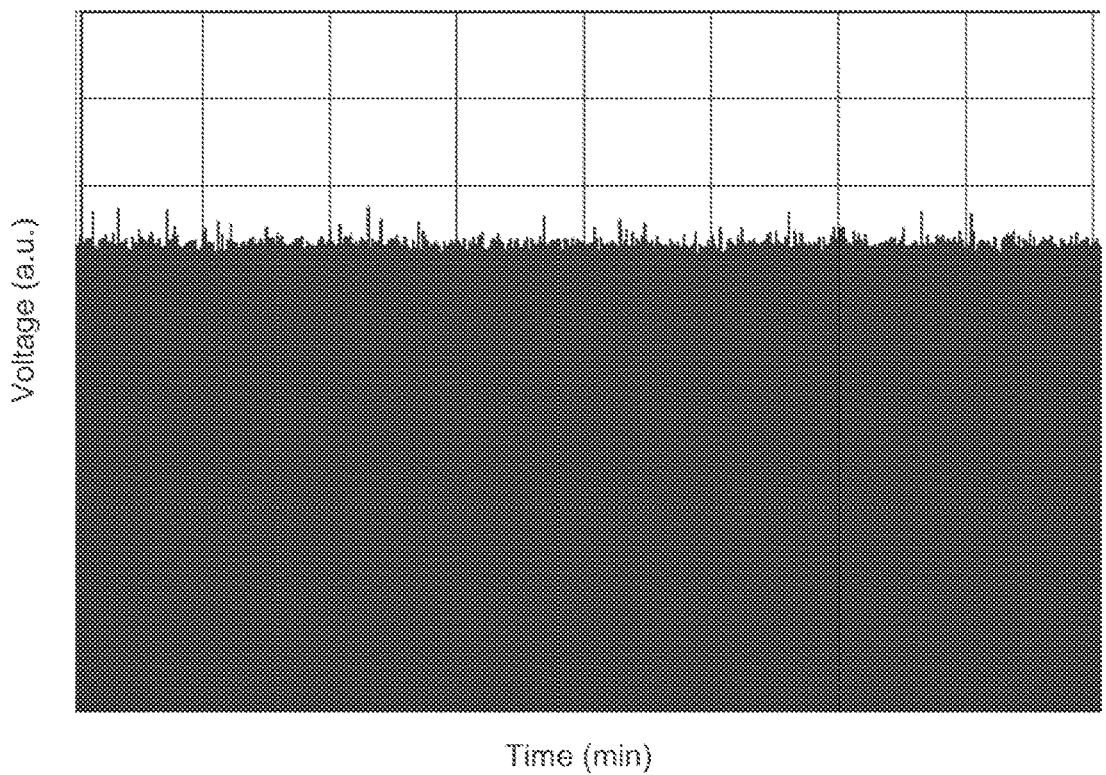
FIG. 9 is waveform data showing a noise signal received by a transparent antenna of a liquid crystal display device according to the first modification.
Figure 10:
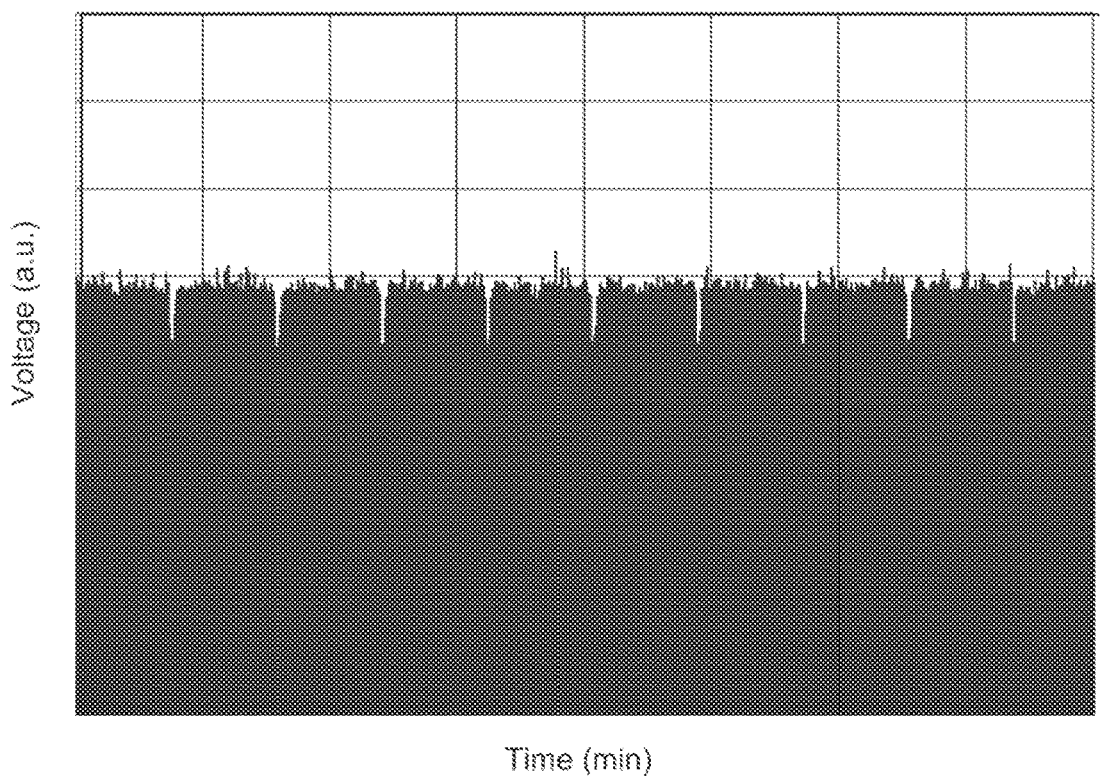
FIG. 10 is waveform data showing a noise signal received by a transparent antenna of a liquid crystal display device according to a first comparative example.

A comparative experiment was performed in order to confirm the shield effect of the second conductive film LY2 described above. Results of the comparative experiment are shown in FIGS. 9 and 10. FIG. 9 shows waveform data obtained by measuring a change in a noise voltage of the liquid crystal display device according to the first modification over time in a state of setting a potential of the second conductive film LY2 to a reference potential and connecting a measuring instrument to the antenna connection line portion 52 of the transparent antenna 50, in the liquid crystal display device according to the first modification described above. In addition, an example in which the second conductive film LY2 was not formed in the liquid crystal display device according to the first modification is a first comparative example, and waveform data obtained by measuring a change in a noise voltage of the liquid crystal display device according to the first comparative example over time in a manner similar to that of the first modification is shown in FIG. 10.

It can be seen from the waveform data of the first comparative example shown in FIG. 10 that a spike-like noise at which the noise voltage significantly fluctuates was observed at regular intervals. The spike-like noise is caused because the antenna body portion 51 receives the noise from the drive circuit of the liquid crystal panel 40. On the other hand, the spike-like noise was not observed in the waveform data of the first modification shown in FIG. 9. It can be said that the reason is that it was possible to suppress the noise from the liquid crystal panel 40 to the transparent antenna 50 (antenna body portion 51) by the shield effect of the second conductive film LY2 interposed between the liquid crystal panel 40 and the antenna body portion 51.

Second Embodiment

In a second embodiment, a transparent antenna substrate 55 and various members arranged on the transparent antenna substrate 55 have a laminated structure similar to that of the first embodiment, and a second conductive film LY2 constitutes a position detection electrode that detects an input position by a finger (an example of a position input body) performing position input. In the second embodiment, an overlapping description of the same configurations, actions, and effects as those of the first embodiment, the first modification, and the second modification will be omitted.

Figure 11:
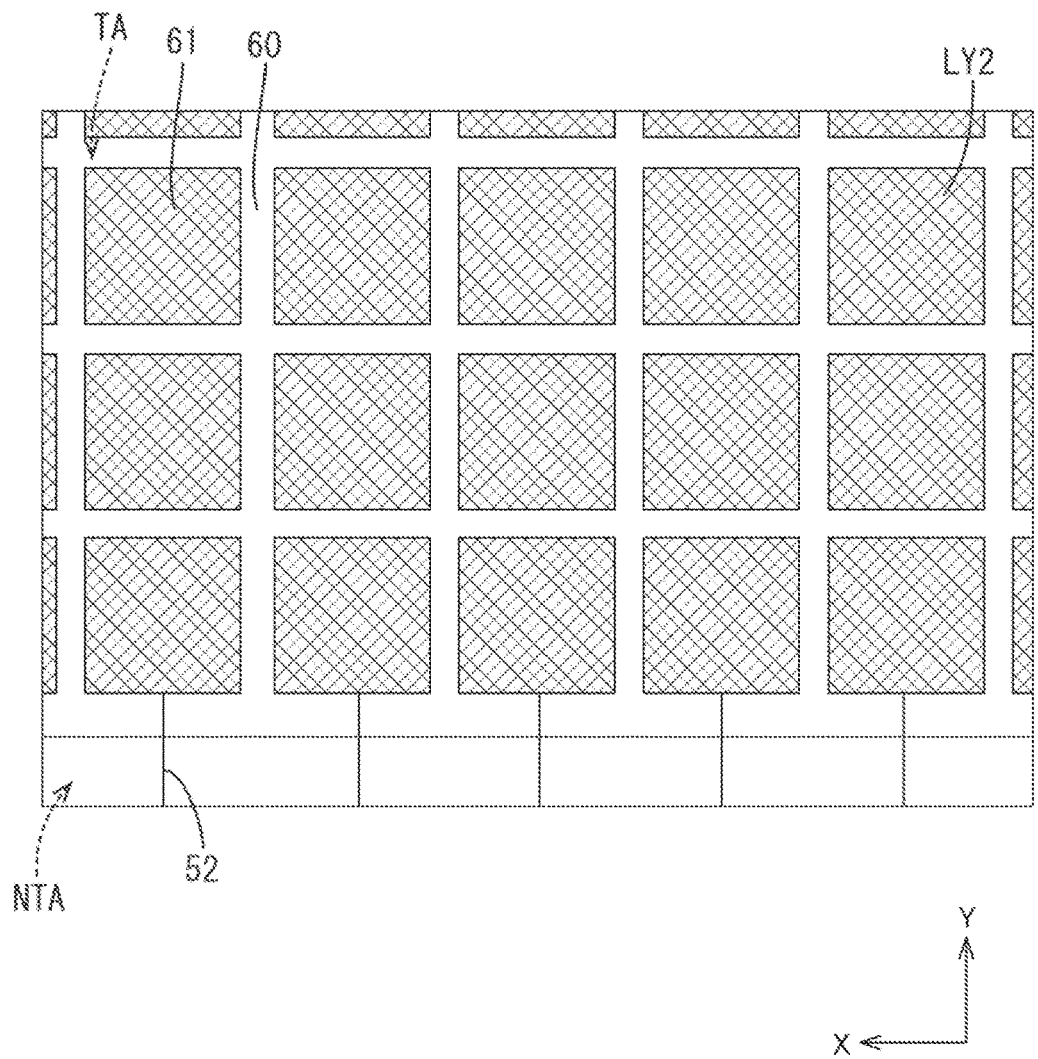
FIG. 11 is a partial plan view of a second conductive film of a liquid crystal display device according to a second embodiment.

In the present embodiment, as shown in FIG. 11, multiple voids 60 are formed in a lattice shape along an X-axis direction and a Y-axis direction in the second conductive film LY2 having a mesh shape, so that multiple touch electrodes (position detection electrodes) 61 arranged side by side in a matrix shape are configured. The second conductive film LY2 is formed over an entire area overlapping a display area AA of a liquid crystal panel 40, and the touch electrodes 61 are also arranged side by side in the entire area. Therefore, the display area AA in the liquid crystal panel 40 substantially coincides with a touch area (position detection area) TA in which the input position can be detected, in plan view, and a non-display area NAA in the liquid crystal panel 40 substantially coincides with a non-touch area (non-position detection area) NTA in which the input position cannot be detected.

The plurality of touch electrodes 61 are arranged side by side at equal intervals along the X-axis direction and the Y-axis direction in the touch area TA, as shown in FIG. 11. The touch electrode 61 has a square shape in plan view, a dimension of one side of the touch electrode 61 is about 5 mm, and a plane size of the touch electrode 61 is far larger than that of a pixel of the liquid crystal panel 40. The touch electrodes 61 are connected to a detection circuit through touch lines 62 that are lead lines to the non-touch area NTA. This detection circuit is provided, for example, in the driver LSI 46 described above.

According to such a configuration, when a user brings his/her finger, which is a conductor, close to a front side of the liquid crystal panel 40 in order to perform position input on the basis of an image of the liquid crystal panel 40, a capacitance is formed between the touch electrode 61 on the front side of the liquid crystal panel 40 and the finger. Thus, as the finger is brought close to the touch electrode 61, the capacitance detected by the touch electrode 61 close to the finger is changed to be different from that of a touch electrode 61 distant from the finger, and it is thus possible to detect the input position on the basis of such a difference. In other words, a so-called self-capacitance type position detection function is realized.

Since the touch electrodes 61 are formed by partitioning the second conductive film LY2 having the mesh shape by the voids 60, a role as a shield electrode is maintained, similar to the first embodiment. Since the touch electrodes 61 have both of a position detection function and a shield function, at the time of the driving a transparent antenna 50, it is preferable that a potential of the touch electrodes 61 be set to a reference potential in order to enhance an effect as a shield electrode. Here, the driving of the transparent antenna 50 includes data transmission, data reception, and standby of the data reception of the transparent antenna 50.

Third Embodiment

In a third embodiment, the touch electrode 61 shown in the second embodiment is changed into a touch electrode 361 having a bipolar configuration including a first touch electrode (a first position detection electrode or a transmitter electrode) 361A and a second touch electrode (a second position detection electrode or a receiver electrode) 361B capacitively coupled to the first touch electrode. In the third embodiment, an overlapping description of the same configurations, actions, and effects as those of the first embodiment, the second embodiment, the first modification, and the second modification will be omitted.

Figure 12:
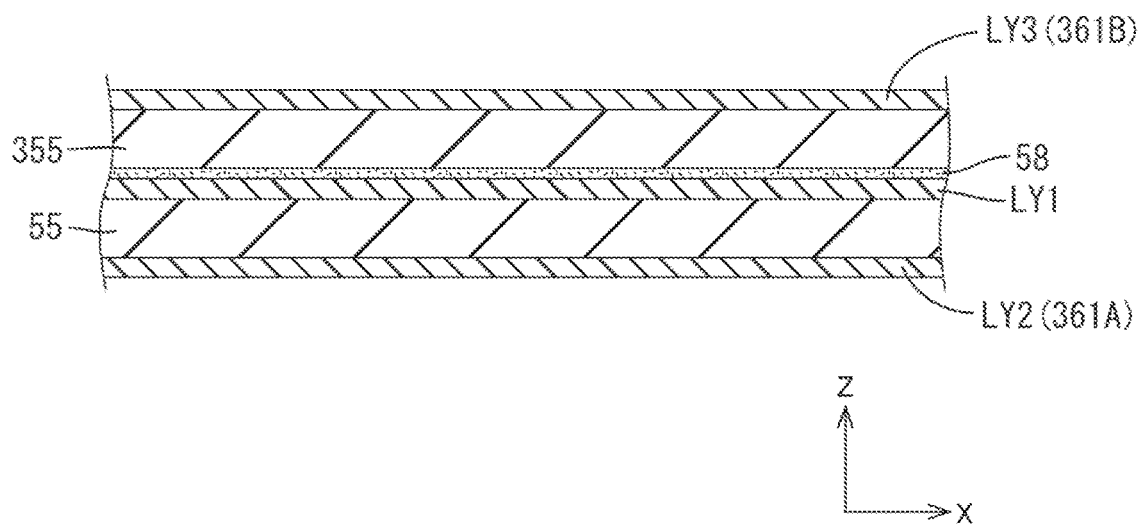
FIG. 12 is a cross-sectional view showing a laminated structure of a transparent antenna substrate and various members arranged on the transparent antenna substrate according to a third embodiment.

A laminated structure of a transparent antenna substrate and various members arranged on the transparent antenna substrate in the present embodiment is shown in FIG. 12. In the first embodiment, the transparent antenna substrate 55 on which the first conductive film LY1 is formed on the front side and the second conductive film LY2 is formed on the back side is included, but in the present embodiment, another transparent antenna substrate 355 on which a third conductive film LY3 having a mesh shape is formed is arranged on a front side (an upper side of FIG. 12) of the transparent antenna substrate 55. The two transparent antenna substrates 55 and 355 are fixed and integrated with each other by a transparent adhesive layer 58. The transparent antenna substrate 355 has a configuration similar to that of the transparent antenna substrate 55 of the first embodiment. In addition, it is preferable that a mesh pattern of the third conductive film LY3 coincide with those of the first conductive film LY1 and the second conductive film LY2 in order to prevent a decrease in light transmittance. In other words, it is preferable that a mesh of the third conductive film LY3 overlap a mesh of the first conductive film LY1 and a mesh of the second conductive film LY2.

Figure 13:
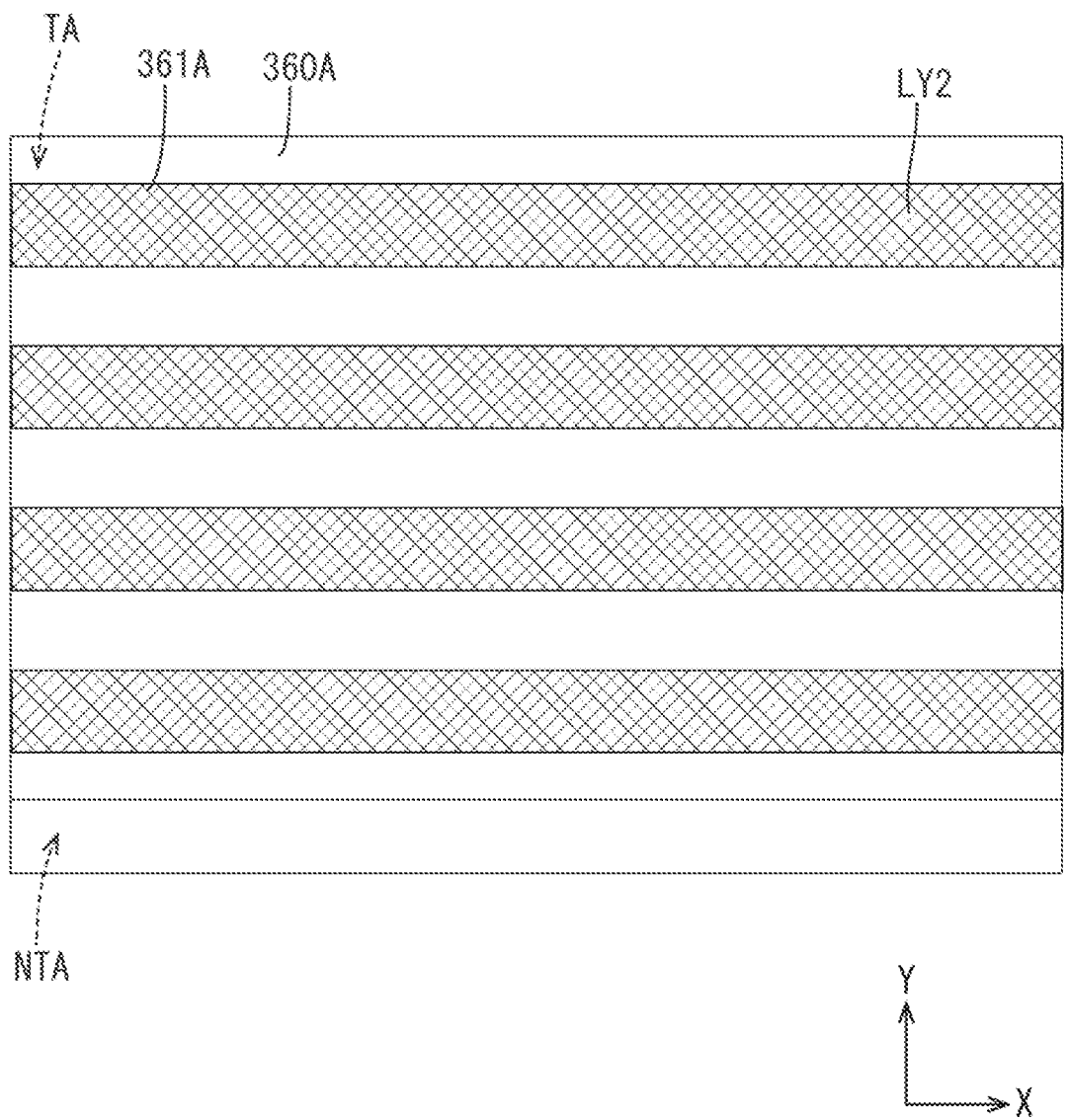
FIG. 13 is a partial plan view of a second conductive film of a liquid crystal display device according to the third embodiment.
Figure 14:
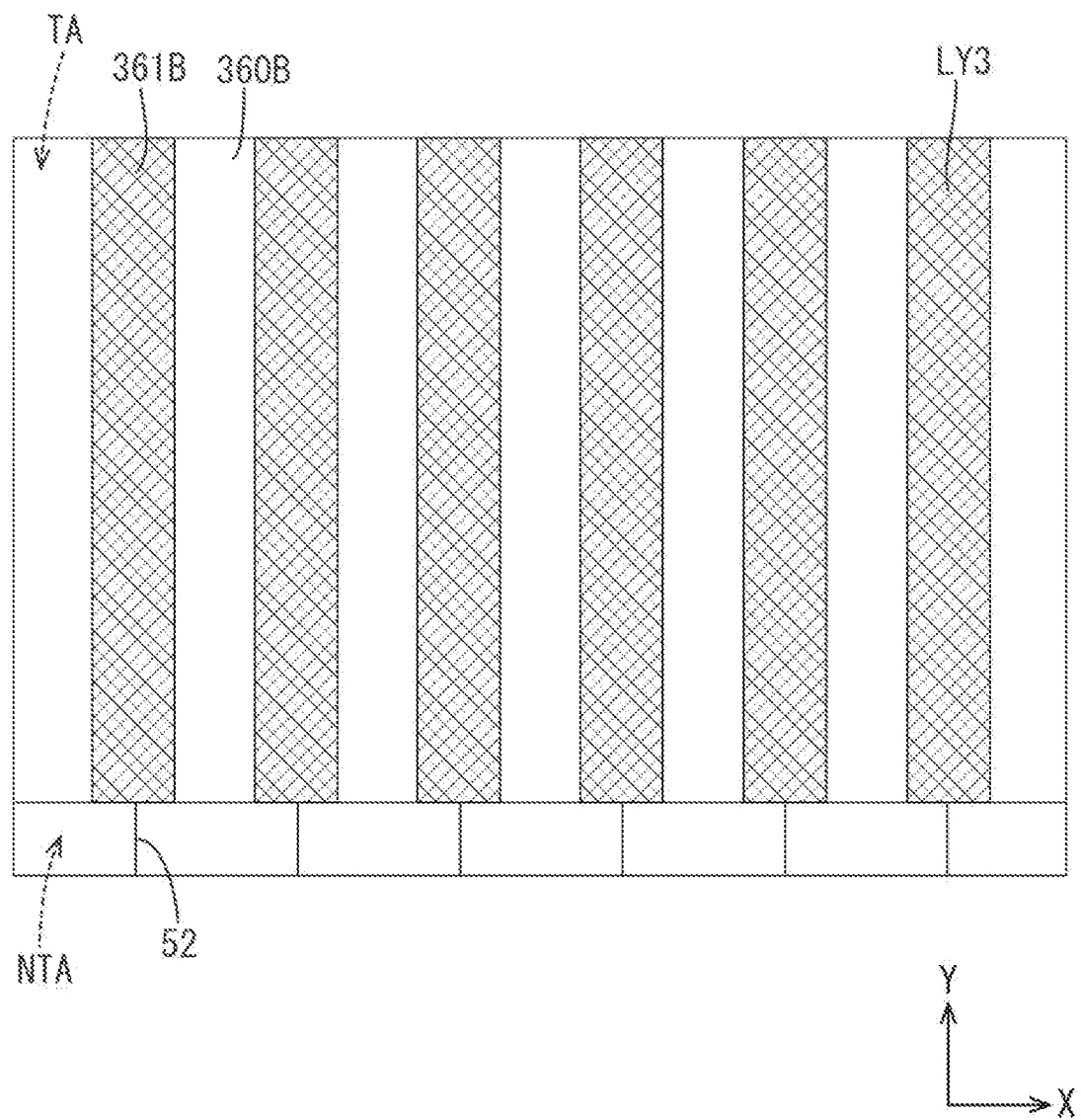
FIG. 14 is a partial plan view of a third conductive film of a liquid crystal display device according to the third embodiment.

In the second conductive film LY2, as shown in FIG. 13, first touch electrodes 361A whose planar shape is a horizontally long band shape are formed by voids 360A provided along an X-axis direction. Multiple first touch electrodes 361A are formed in a touch area TA so as to extend along a long side direction (the X-axis direction), and are arranged side by side at equal intervals in a short side direction (a Y-axis direction). In addition, in the third conductive film LY3, as shown in FIG. 14, second touch electrodes 361B whose planar shape is a vertically long band shape are formed by voids 360B provided along the Y-axis. Multiple second touch electrodes 361B are formed in the touch area TA so as to extend along the short side direction (the Y-axis direction), and are arranged side by side at equal intervals in the long side direction (the X-axis direction).

According to such a configuration, it is possible to detect an input position in the Y-axis direction by the first touch electrodes 361A and detect an input position in the X-axis direction by the second touch electrodes 361B. In addition, the first touch electrode 361A and the second touch electrode 361B are capacitively coupled to each other between layers, and an electric field is formed between the first touch electrode 361A and the second touch electrode 361B. Since a part of the electric field is directed to a user's finger when a user brings his/her finger, which is a conductor, close to a front surface of a liquid crystal panel 40, capacitive coupling is formed between these touch electrodes and the finger. Thus, a capacitance between the first touch electrode 361A and the second touch electrode 361B close to the finger is obtained by subtracting capacitances formed between these touch electrodes and the finger from each other, and it is possible to detect the input position on the basis of the capacitance. According to such mutual capacitance type position detection, it is possible to improve the position detection sensitivity as compared with the self-capacitance type position detection described above.

Fourth Embodiment

Figure 15:
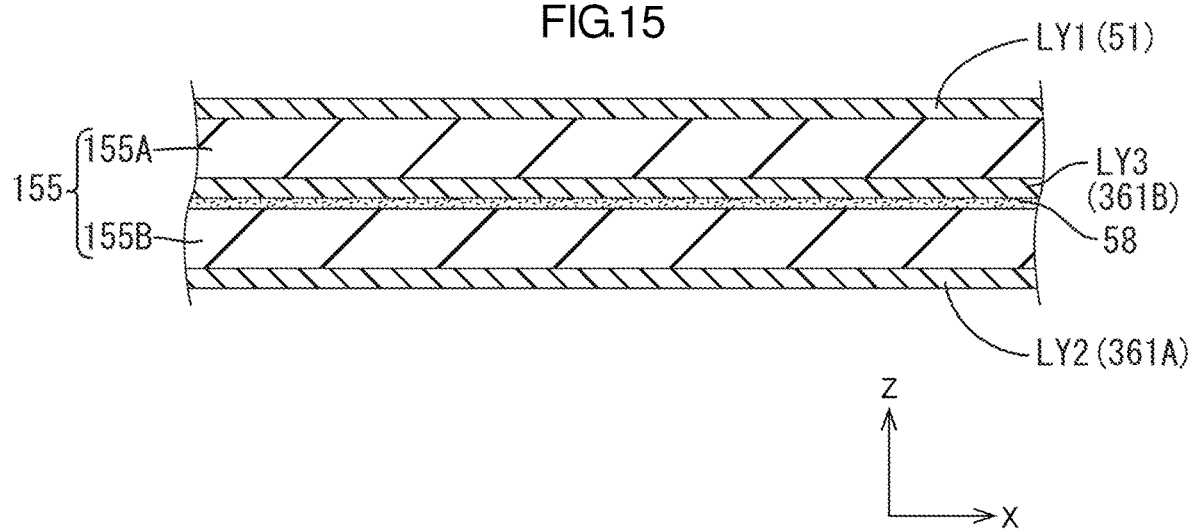
FIG. 15 is a cross-sectional view showing a laminated structure of a transparent antenna substrate and various members arranged on the transparent antenna substrate according to a fourth embodiment.

In a fourth embodiment, as shown in FIG. 15, a third conductive film LY3 similar to that of the third embodiment is arranged on a surface of the first transparent antenna substrate 155A in the second modification of FIG. 8 opposite to the first conductive film LY1. In the third conductive film LY3, similar to the third conductive film LY3 of the third embodiment shown in FIG. 14, second touch electrodes 361B are formed. In addition, in a second conductive film LY2, similar to the second conductive film LY2 of the third embodiment shown in FIG. 13, first touch electrodes 361A are formed. In the fourth embodiment, an overlapping description of the same configurations, actions, and effects as those of the first to third embodiments, the first modification, and the second modification will be omitted.

In a case where a transparent antenna substrate 155 is a plurality of configurations including a first transparent antenna substrate 155A and a second transparent antenna substrate 155B as in the first modification and the second modification, a surface on which the first conductive film LY1 or the second conductive film LY2 is not formed exists on these substrates. For this reason, when the third conductive film LY3 is arranged on such a surface (a surface of the first transparent antenna substrate 155A opposite to the first conductive film LY1 or a surface of the second transparent antenna substrate 155B opposite to the second conductive film LY2) to form the second touch electrodes 361B, it is easy in terms of manufacture to arrange the third conductive film LY3 and form the second touch electrodes 361B.

Fifth Embodiment

In a fifth embodiment, a transparent antenna substrate 55 and various members arranged on the transparent antenna substrate 55 have a laminated structure similar to that of the first embodiment, second touch electrodes 361B similar to those of the third embodiment are formed in a first conductive film LY1, and first touch electrodes 361A are formed in a second conductive film LY2. In the fifth embodiment, an overlapping description of the same configurations, actions, and effects as those of the first to fourth embodiments, the first modification, and the second modification will be omitted.

Figure 16:
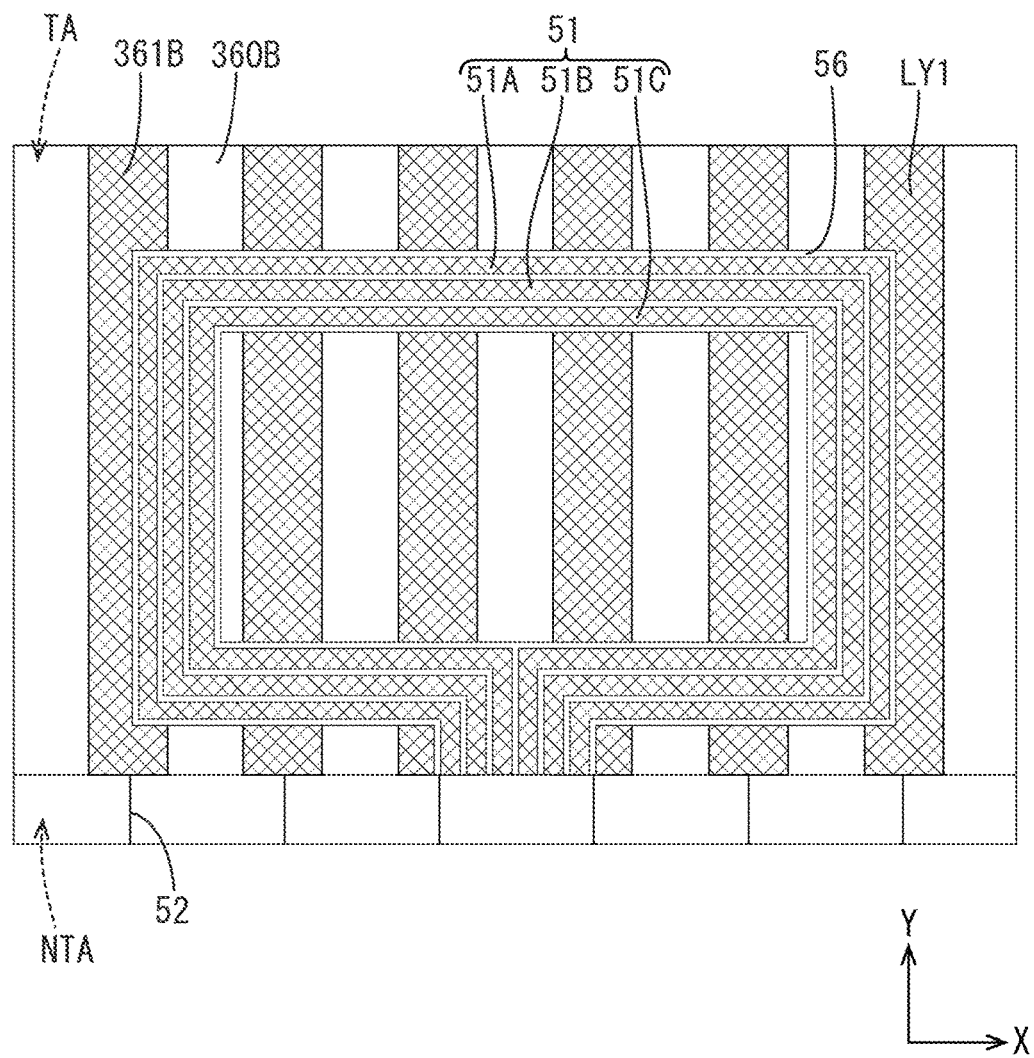
FIG. 16 is a view corresponding to FIG. 4 for a liquid crystal display device according to a fifth embodiment.

The fifth embodiment includes a transparent antenna substrate 55 on which a first conductive film LY1 is formed on a front side and a second conductive film LY2 is formed on a back side, similar to the first embodiment shown in FIG. 2. As shown in FIG. 16, multiple antenna body portions 51 similar to those of the first embodiment and multiple second touch electrode 361B similar to that of the third embodiment and having a vertically long band shape are formed along an X-axis direction in the first conductive film LY1. In addition, multiple of first touch electrodes 361A having a vertically long band shape are formed in the second conductive film LY2, shown in FIG. 13, similar to the third embodiment.

According to such a configuration, the second touch electrodes 361B can be formed in the first conductive film LY1 without providing the third conductive film LY3, and it is thus possible to reduce the number of stacked layers to reduce a thickness of a film and improve position detection sensitivity by mutual capacitance type position detection. In this case, since both of the antenna body portion 51 and the second touch electrodes 361B are formed in the first conductive film LY1, it is preferable that a drive operation of a transparent antenna 50 and a position detection operation be not performed at the same time, but are performed separately. It is possible to stabilize the respective operations by avoiding interference between the operations.

Sixth Embodiment

In a sixth embodiment, a transparent antenna substrate 55 and various members arranged on the transparent antenna substrate 55 have a laminated structure similar to that of the first embodiment, and a touch area TA is provided so as to be spaced apart from an antenna area EA in which an antenna body portion 51 is formed in a first conductive film LY1, by a predetermined interval in plan view. In the sixth embodiment, an overlapping description of the same configurations, actions, and effects as those of the first to fifth embodiments, the first modification, and the second modification will be omitted.

The sixth embodiment includes a transparent antenna substrate 55 on which a first conductive film LY1 is formed on a front side and a second conductive film LY2 is formed on a back side, similar to the first embodiment shown in FIG. 2. In the first conductive film LY1, as shown in an overall plan view of FIG. 17, an antenna area EA provided on a side close to the antenna body portion 51 side and a touch area TA in a plane of the first conductive film LY1 are spaced apart from each other by a predetermined interval by a gap 90 along a Y-axis direction. In FIG. 17, substantially a half of a right side of the first conductive film LY1 is the antenna area EA and substantially a half of a left side of the first conductive film LY1 is the touch area TA. The antenna body portion 51 is formed in the antenna area EA of the first conductive film LY1, similar to in the first embodiment, and second touch electrodes 361B are formed in the touch area TA of the first conductive film LY1, similar to the third embodiment. In addition, in the second conductive film LY2, as shown in an overall plan view of FIG. 18, first touch electrodes 361A are formed in an area overlapping the touch area TA of the first conductive film LY1 in a plane of the second conductive film LY2, similar to the third embodiment. On the other hand, only a mesh pattern is formed in an area of the second conductive film LY2 overlapping the antenna area EA of the first conductive film LY1. Note that lines and the like arranged on an outer peripheral edge portion overlapping a non-display area NAA of a liquid crystal panel are omitted in FIGS. 17 and 18.

With such a configuration, the antenna body portion 51 and the second touch electrodes 361B are formed in separate areas, respectively, in the first conductive film L1, and it is thus possible to simultaneously perform a drive operation of a transparent antenna 50 and a position detection operation, unlike the fifth embodiment. In addition, voids or the like other than the mesh pattern are not formed in an area facing the antenna area EA, in the second conductive film LY2, and it is thus possible to realize a high shield effect equivalent to that of the first embodiment.

Other Embodiments

The present technology is not limited to the embodiments described with reference to the above description and drawings, and, for example, the following embodiments are also included in the technical scope.

(1) An example of the patterns of the stitches of the first conductive film, the second conductive film, and the third conductive film has been described in the embodiment, but a shape, an arrangement state or the like of each mesh can be appropriately changed as long as it is a mesh shape.

(2) An example in which the planar shape of the touch electrode is the square shape has been described in the second embodiment and an example in which the planar shape of the first touch electrode is the horizontally long band shape and the planar shape of the second touch electrode is the vertically long band shape has been described in the third embodiment, but shapes of the touch electrodes, the number of installed touch electrodes, arrangements of the touch electrodes, and the like, can be appropriately changed.

(3) An example in which the touch electrodes are formed in the second conductive film of the first embodiment has been described in the second embodiment, but the touch electrodes may be formed in the second conductive film of the first modification and the second modification.

(4) An example in which the first touch electrodes and the second touch electrodes are formed in different layers has been described in the third to sixth embodiments, but the first touch electrodes and the second touch electrodes may be formed in the same conductive film as long as they are arranged so as to be capacitively coupled to each other. For example, by arranging the first touch electrodes having a square shape and the second touch electrodes having a square shape in pairs and arranging the paired touch electrodes side by side entirely in a plane of the second conductive film in the second embodiment, it is possible to realize a mutual capacitance type position detection function.

(5) The antenna area and the touch area are divided substantially equally in a horizontal direction in plan view in the sixth embodiment, but a size ratio, a position, a shape, and the like of each area can be appropriately changed. In addition, in the first modification and the second modification, inner portions of planes of the first conductive film and the second conductive film may be partitioned into an antenna area and a touch area as in the sixth embodiment. Furthermore, in the touch area of the sixth embodiment, the touch electrodes may be formed in only any one of the first conductive film and the second conductive film to apply self-capacitance type position detection, similar to the second embodiment, or the first touch electrodes and the second touch electrodes may be formed in the same conductive film, as described in the above (4).

(6) An example in which a single transparent antenna is arranged in the vicinity of the corner of the liquid crystal panel has been described in the embodiment described above, but an installation place of the single transparent antenna is not limited. In addition, a plurality of transparent antennas may be arranged in the liquid crystal panel.

(7) An example in which the external communication device is the IC card has been described in each of the embodiments described above, but another electronic device having a communication function, such as a smartphone or the like may be used. In addition, an example in which the IC card-side antenna and the transparent antenna perform non-contact communication through the coupling by the electromagnetic induction between the coils has been described in each of the embodiments described above, but non-contact communication may be performed by electric field coupling or magnetic field coupling, or a combination thereof.

(8) The liquid crystal panel has been exemplified as a display panel in each of the embodiments described above, but the present technology can be applied to other types of display panels (an organic EL panel, a plasma display panel (PDP), an electrophoretic display panel (EPD), a micro electro mechanical systems (MEMS) display panel, and the like).

The invention claimed is:

1. A display device comprising:
    a display panel displaying an image; and
    a transparent antenna being disposed on a front surface of the display panel, the transparent antenna comprising:
        a transparent substrate having a sheet shape and transparency;
        a first conductive film being attached to a front surface of the transparent substrate and having a wire mesh sheet shape including first linear solid sections parallel to each other and second linear solid sections parallel to each other and perpendicular to the first linear solid sections, the first conductive film including at least two slits extending parallel to each other to define an antenna body portion insulated from a portion of the first conductive film surrounding the antenna body portion to perform wireless communication with an external communication device;
        a second conductive film being attached to a back surface of the transparent substrate and having a mesh sheet shape including third linear solid sections parallel to each other and fourth linear solid sections parallel to each other and perpendicular to the third linear solid sections; and
        an antenna connection line coupled to the antenna body portion for connecting the transparent antenna to an external device other than the external communication device, wherein
    the third linear solid sections are opposed to the first linear solid sections, respectively, and
    the fourth linear solid sections are opposed to the second linear solid sections, respectively.

2. The display device according to claim 1, wherein the second conductive film has a reference potential.

3. The display device according to claim 1, further comprising a drive circuit disposed on a peripheral edge portion of the display panel and configured to drive the display panel, wherein
    the antenna body portion is near the peripheral edge portion.

4. The display device according to claim 1, wherein
    the transparent substrate is defined as a first transparent substrate,
    the transparent antenna further comprises a second transparent substrate disposed behind the second conductive film and attached to a back surface of the second conductive film.

5. The display device according to claim 1, wherein the second conductive film includes position detection electrode sections divided by voids for detecting an input position input by a position input body through position input.

6. The display device according to claim 5, wherein the position detection electrode sections have a reference potential at a time of driving the antenna body portion.

7. The display device according to claim 1, wherein
    the transparent substrate is defined as a first transparent substrate,
    the transparent antenna further comprises:
        a second transparent substrate attached to a front surface of the first conductive film; and
        a third conductive film being attached to a front surface of the second transparent substrate and having a metal mesh sheet shape including fifth linear solid sections parallel to each other and sixth linear solid sections parallel to each other and perpendicular to the fifth linear solid sections,
    the fifth linear solid sections are opposed to the first linear solid sections, respectively,
    the sixth linear solid sections are opposed to the second linear solid sections, respectively,
    the second conductive film includes first position detection electrode sections divided by first voids that extend in a first direction, and
    the third conductive film includes second position detection electrode sections divided by second voids that extend in a second direction perpendicular to the first direction and to be capacitively coupled to the first position detection electrode sections.

8. The display device according to claim 1, wherein
    the second conductive film includes first position detection electrode sections divided by first voids that extend in a first direction, and
    the first conductive film includes second position detection electrode sections divided by second voids that extend in a second direction perpendicular to the first direction.

9. The display device according to claim 8, wherein
the first conductive film includes a position detection area and an antenna area that is separated from the position detection area,
the position detection area includes the second position detection electrode sections, and
the antenna area includes the antenna body portion.

10. A communication system comprising:
the display device according to claim 1; and
an external communication device that is communicable with the transparent antenna.

11. The display device according to claim 1, wherein
the first linear solid sections and the third linear solid sections have widths equal to each other,
the second linear solid sections and the fourth linear solid sections have widths equal to each other,
the first linear solid sections and the third linear solid sections are arranged at first intervals that are equal to each other, and
the second linear solid sections and the fourth linear solid sections are arranged at second intervals that are equal to each other.

12. A display device comprising:
a display panel displaying an image; and
a transparent antenna being disposed on a front surface of the display panel, the transparent antenna comprising:
  a first transparent substrate having a sheet shape and transparency;
  a first conductive film being attached to a front surface of the first transparent substrate and having a wire mesh sheet shape including first linear solid sections parallel to each other and second linear solid sections parallel to each other and perpendicular to the first linear solid sections, the first conductive film including at least two slits extending parallel to each other to define an antenna body portion insulated from a portion of the first conductive film surrounding the antenna body portion to perform wireless communication with an external communication device;
  a second transparent substrate having a sheet shape and transparency;
  a second conductive film being attached to a back surface of the second transparent substrate and having a mesh sheet shape including third linear solid sections parallel to each other and fourth linear solid sections parallel to each other and perpendicular to the third linear solid sections;
  a third conductive film being attached to a back surface of the first transparent substrate and a front surface of the second transparent substrate and having a mesh sheet shape including fifth linear solid sections parallel to each other and sixth linear solid sections parallel to each other and perpendicular to the fifth linear solid sections; and
  an antenna connection line coupled to the antenna body portion for connecting the transparent antenna to an external device other than the external communication device, wherein
the fifth linear solid sections are opposed to the first linear solid sections, respectively,
the sixth linear solid sections are opposed to the second linear solid sections, respectively,
the third linear solid sections are opposed to the fifth linear solid sections, respectively, and
the fourth linear solid sections are opposed to the sixth linear solid sections, respectively.

13. The display device according to claim 12, wherein
the second conductive film includes first position detection electrode sections divided by first voids that extend in a first direction, and
the third conductive film includes second position detection electrode sections divided by second voids that extend in a second direction perpendicular to the first direction and to be capacitively coupled to the first position detection electrode sections.

* * * * *